(12) United States Patent
Roskind

(10) Patent No.: US 7,427,033 B1
(45) Date of Patent: Sep. 23, 2008

(54) TIME-VARYING SECURITY CODE FOR ENABLING AUTHORIZATIONS AND OTHER USES OF FINANCIAL ACCOUNTS

(76) Inventor: James Roskind, 920 Governors Bay Dr., Redwood City, CA (US) 94065

( * ) Notice: Subject to any disclaimer, the term of this patent is extended or adjusted under 35 U.S.C. 154(b) by 194 days.

(21) Appl. No.: 11/363,754

(22) Filed: Feb. 27, 2006

Related U.S. Application Data

(60) Provisional application No. 60/656,602, filed on Feb. 26, 2005.

(51) Int. Cl.
*G06K 19/06* (2006.01)

(52) U.S. Cl. ........................ 235/492; 235/380; 235/487

(58) Field of Classification Search ................ 235/492, 235/380, 382, 382.5, 375, 451, 487
See application file for complete search history.

(56) References Cited

U.S. PATENT DOCUMENTS

| | | | | |
|---|---|---|---|---|
| 6,130,621 | A * | 10/2000 | Weiss | 340/5.28 |
| 6,377,792 | B1 * | 4/2002 | Brown et al. | 455/411 |
| 6,985,583 | B1 * | 1/2006 | Brainard et al. | 380/44 |
| 2003/0105964 | A1 * | 6/2003 | Brainard et al. | 713/178 |
| 2004/0172535 | A1 * | 9/2004 | Jakobsson et al. | 713/168 |
| 2006/0020960 | A1 * | 1/2006 | Relan et al. | 725/30 |

OTHER PUBLICATIONS

U.S. Appl. No. 11/364,797, filed Feb. 27, 2006, Roskind, James.

* cited by examiner

*Primary Examiner*—Edwyn Labaze
(74) *Attorney, Agent, or Firm*—Shemwell Mahamedi LLP

(57) ABSTRACT

A portable device is provided that carries account data. The account data may include a security code having a value that is time-varying. The value of the security code may be programmatically varied based on at least one of an algorithm or event. Authorization and use of the account may be sought from an authorization agent using the account data provided on the portable device.

19 Claims, 4 Drawing Sheets

TIME-VARYING SECURITY CODE FOR ENABLING AUTHORIZATIONS AND OTHER USES OF FINANCIAL ACCOUNTS

RELATED APPLICATIONS

This application claims benefit of priority to U.S. Provisional Application No. 60/656,602, filed Feb. 26, 2005; the aforementioned priority application being incorporated by reference in its entirety for all purposes.

TECHNICAL FIELD

The disclosed embodiments relate generally to the field of electronic security, and more specifically, to security codes for authorizing use of financial accounts.

BACKGROUND

Historically, financial cards, such as credit cards, debit cards, ATM cards and bank cards, often have several elements that are readable by different means. The elements commonly include data on a magnetic stripe, a data in raised print, and data printed or embedded in the card. For example, raised print may include a user's name, account number, and/or expiration date, printed data may include a static security code such as a Card Verification Value (CVVo) or sometimes referred to as a CVC code, and the magnetic stripe may include some or all of that information, plus additional data. One function that can be served with the static security code is to ensure the person using the card is authorized to do so. With expansion of Internet and remote commerce, the need for enhanced security on such cards has increased.

DETAILED DESCRIPTION

Figure 1:
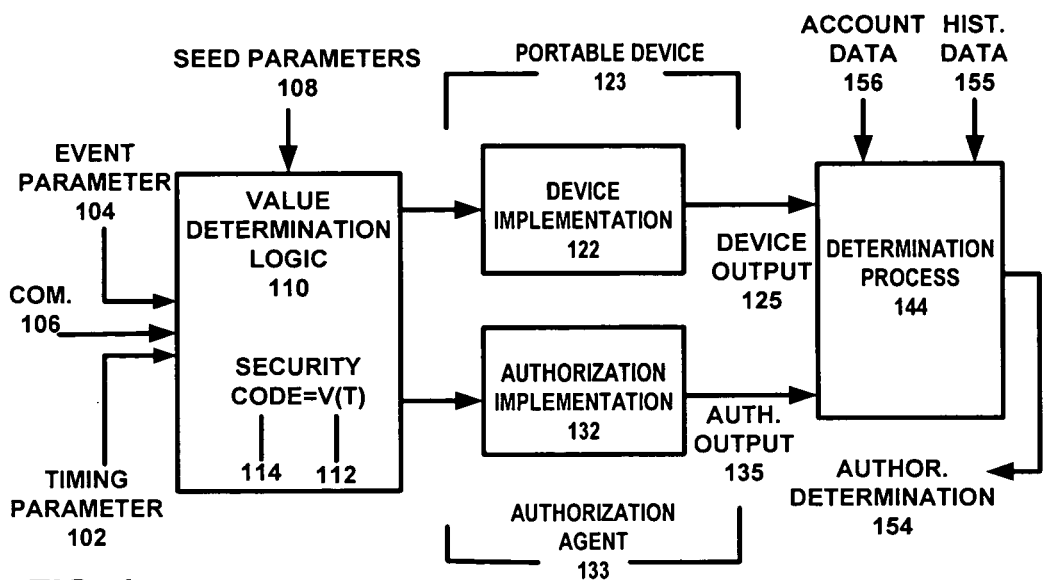
FIG. 1 is a basic block diagram of a scheme in which time-varying security codes are used for purpose of authorizing and using financial accounts and/or resources, according to an embodiment of the invention.

Embodiments described herein enable authorization and use of a financial account, using a portable financial device having a time-varying security code value. In particular, one or more embodiments provide for the portable device to be in the form a card device, and more particularly, a standardized financial card device. The device may include intelligence and other resources to include a security code that changes values with time. This security code may form a basis for authorizing use of the device, by providing verification that the person using the card is actually in possession of the card.

According to an embodiment, a time-varying security code is provided to replace a more traditional static security code parameter, sometimes called a CVV or CVC code, on standardized financial card devices. As such, embodiments described herein contemplate implementation in devices that are used as credit cards and debit cards.

Overview

In one embodiment, a portable device is provided that carries account data. The account data may include a security code having a value that is time-varying. The value of the security code may be programmatically varied based on at least one of an algorithm or event. Authorization and use of the account may be sought from an authorization agent using the security code value and account data provided on the portable device.

According to an embodiment, a portable device under the control of the user may be associated with a financial account. The portable device may include account data for enabling identification and authorization of the account to be made, where the account data includes a security code having a variable or time-varying value. On a portable device, the value of the security code may be changed based on an algorithm or event, and the value of the security code may be provided in human-readable form. On an authorization system (or agent), the value of the security code may be determined when use of the account is requested using the portable device.

According to an embodiment, a card device is provided for enabling use of an account. The card device includes one or more mediums on which a plurality of information items are carried. The information items may enable a user of the card device to be authorized to use the account. According to one embodiment, the plurality of information items include (i) a static data set, and (ii) a security code that is time-varying or dynamic. Additionally, the card device may include logic for determining the value of the security code based at least in part on an event or algorithm.

In an embodiment the logic is configured such that it coordinates the value of the security code with an authorization agent. For example, the authorization agent is capable of independently determining one or more expected values of the security code when authorization is needed, and depending on the value of the security code presented from the requestor (who may view or read from the card), authorization may be made based on comparing the presented and expected values of the security code.

In one implementation, the static data set includes information that identifies the code and/or the account user or holder. This information may be provided on a computer-readable medium section of the card, such as on a magnetic strip, or on a human readable medium, such as on raised or printed medium.

In one embodiment, the value of the security code may be displayed in human readable form. For example, the value of the security code may be displayed on a small display surface of the card device.

According to an embodiment, the value of the security code is based on seed parameters, including seed parameters for use with or as timing parameters or event parameters. The logic may determine the value of the security code that is acceptable to an authorizing agent.

As used herein, the term "logic" refers to programmatic resources, including programmatic instructions in the form of firmware, software or hardware. Under one embodiment, a processor (or processors) implements logic for use with one or more embodiments on a card device. According to one implementation, a microprocessor is embedded within the thickness of a standardized financial card device, such as a smart card, credit card or debit card.

As used herein, a card device is a flat and/or substantially rectangular structure. For example, a rectangular credit card or debit card that is typically kept in a user's wallet has a form factor of a card device. The exact dimensions of the card device or design implementations may vary. A specific form of a card device contemplated by one or more embodiments is a card device that is a standardized financial device, having set dimensions and format set by the International Organization for Standardization (ISO). Still further, it is possible for a card device to have alternative shapes, such as being rounded, elliptical or other.

Methods, steps of methods, processes, sub-processes and techniques may all be programmatically implemented or facilitated by embodiments of the invention, In this regard, one or more embodiments described herein may be implemented in whole or in part through the use of instructions that are executable by one or more processors. These instructions may be carried on a computer-readable medium. Machines, devices, processors, and other programmatic components shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

As used herein, the term "programmatic", "programmatically" or variations thereof means though the use of computer-implemented instructions.

Scheme Overview

FIG. 1 is a basic block diagram of a scheme in which time-varying security codes are used for purpose of authorizing and using financial accounts and/or resources, according to an embodiment of the invention. As will be described, an embodiment provides that value determination logic 110 enables a portable device associated with a financial account (or financial resources) to carry and display a security code value that is time varying or otherwise dynamic. The time-varying security code value can also be independently determined by an authorization agent. As such, its use on a portable financial device can validate that the person attempting to use the portable device is actually in possession of the device at the time the authorization of the account is sought as, most likely, only the holder of the portable device (aside from the authorization agent) would know what the value of the security code at a given instance. This provides a more secure means by which card devices, such as credit cards and debit cards, can be used, such as when such devices are used for remote transactions (e.g. over the telephone or through the Internet). For example, some traditional credit cards use static security code values, presented on the card. Since the values of such traditional devices are static, a person who has access to the card information at one time can reuse the card information for remote transactions at any subsequent time with no true validation being made that he or she is in possession of the card (and thus presumably authorized to use the card).

Value determination logic 110 includes algorithms, processes and deterministic methodologies by which at an instant of time a value 112 of a security code 114 is determined. For a given account or user, the value 112 may change over time (e.g. change repeatedly in one day) and/or in response to specific events (e.g. change after each purchase). Under one or more embodiments, the value determination logic 110 includes a device implementation 122 and an authorization implementation 132. The device implementation 122 may correspond to logic executed by processing resources (e.g. microprocessor that runs a program) that execute specific algorithms of the overall value determination logic 110 on a portable device 123. Under an embodiment, the portable device 123 may correspond to a standardized financial card device, such as shown and described with FIG. 7A and FIG. 7B. The authorization implementation 132 may correspond to logic executed by a computer system of an authorization agent 133 (such as described with FIG. 4).

Various factors and parameters may be used as input for the value determination logic 110 in determining the security code value 112. Depending on an embodiment implemented, one or more of the following may be used as input to the value determination logic 110, for purpose of determining the security code value: (i) timing parameters 102, (ii) event parameters 104, (iii) commands 106, and/or (iv) seed parameters 108. Given the various parameters and factors that may drive or provide input to the value determination logic 110, at any given time (such as when an authorization request is made), the device implementation 122 of the value determination logic 110 produces a device output 125, and the authorization implementation 132 of the value determination logic 10 outputs an authorization output 135. The device output 125 may correspond to a display of the security code value 112 on the portable device, while the authorization output 135 may correspond to an independent programmatic determination of the security code value 112. Under an embodiment, each of the device output 125 and the authorization output 135 should be equal, or otherwise have correspondence, to one another, as each are derived from the same value determination logic 110, and provided the same input parameters.

Timing parameters 102 enable a time stamp, or the passage of time, such as determined from a programmatic clock, to be a basis for determining the security code value 112. Under one embodiment, the device output 125 (i.e. the displayed security code value) may vary at fixed intervals of time, for example changing once each day, or once each week, or once each month. The manner and frequency of the variation may be based at least in part on the timing parameter 102. For example, a given duration or instance of time may form the basis by which hashing or encryption is performed on a security code value, starting with initial or seed values.

Event parameters 104 may designate specific conditions by which changes to the value of the security code are made, determined, or otherwise triggered. As an example, each use of the portable device to seek authorization may correspond to an event that is programmatically recognized as triggering the change. Still further, in an embodiment, the device output 125 (i.e. displayed security code value) may vary with use, with the usage corresponding to an event identified by the event parameter 104. For example, the displayed security code value may change after a fixed number of detectable uses, or after an aggregate value of detectable transactions has exceeded some threshold (e.g. $500). Other examples of detectable charges and uses include interaction with a transaction device, such as a card reader and/or writer, for example during the completion of a transaction. In such an implementation, a smart card or other portable device may be given information about the transaction to aggregate, and may respond by automatically changing the security code when set limits are reached.

Commands 106 may include directives from an outside source, such as the authorization agent or financial institution. For example, in the case of a card device, the card device may receive communications from the authorization agent when a swipe or transaction is performed. The communications may include commands 106 that change or even specify the value of the security code, or other parameters, such as a new seed parameter 108.

The seed parameter 108 includes initial values that can be used as part of an encryption, hashing, and/or value determination logic, to construct the security code values. One or more embodiments contemplate that multiple parameters are used in combination. For example, the timing parameter 102 and the seed parameters 108 may be used in combination with a hashing algorithm to generate the value 112 of the security code 114 at a particular instance. Additional details on the manner in which the value 112 may be calculated or otherwise determined is described below.

In some embodiments, combinations of the above methods may be used to change or induce a change of a security code. For example, changes in security code may be induced by the completion of a fixed number of transactions, and may automatically be changed after at least some fixed period of time from the last change.

In one embodiment, the security code value 112 may be a pseudo random sequence that is verifiable by an authentication agent or financial institution. For example, a pseudo random sequence may be based on a pseudo random number generator (PRNG) that is driven to generate a new code in response to the passage of time, as indicated by a digital clock, or the presence of seed numbers. For example, a financial institution, such as the issuing bank, may be privy to a seed that is embedded in the PRNG and distributed to the portable device. Subsequently, the portable device and the authorization agent (e.g. financial institution) may be able to remain synchronized. At a given instance, such as when an authorization request is made, the authorization agent may be able to remotely deduce what is being displayed (or otherwise outputted) by the portable device at any given time.

In another embodiment, the timing parameter 102, such as a portion of a time stamp, the date, or other data from an input parameter, may be encrypted and/or hashed (e.g., keyed hash) and/or reduced by a modulus small enough to generate a security code, for example reduction modulo 1000. In such an implementation, the authorization agent may be privy to an encryption key and/or hash key embedded in the portable device, and that information may be used to remotely deduce the security code value at a given moment (e.g. on a specific date). As such, an embodiment provides that, the authorization agent determines the value of the security code by at least performing one decryption or hashing operation using the encryption or hashing key shared with the portable device.

An authorization determination process 144 may receive the device output 125 (as communicated by a user) and the authorization output 135 to make an authorization determination 154. In the most simplistic case, the authorization determination is affirmative if there is a perfect match between device output 125 and authorization output 135. In order to make the authorization determination, account information 156 or data (e.g. account number, account holder, expiration date etc.) may also be communicated to the authorization determination process 144. However, alternative scenarios are possible. For example, in a typical scenario, the device output 125 is communicated manually to the authorization determination process 144. A user may type the value in, or verbalize a value over the phone to one party who then relays it to the authorization agent. Given the dynamic nature, the value may change after the user communicates it to the authorization agent, resulting in a mismatch between the device output 125 and authorization output 135. In an embodiment, the authorization determination process 144 maintains or receives historical data 155 that enables it to determine that an old security code value is recent enough to be acceptable.

As another scenario, a vendor who receives credit or debit card information from a user at one time may seek to enable an electronic wallet that can accept "one-click" commands from the user. In such a scenario, the vendor may submit an old security code value. The historical data 155 may identify that a particular vendor or merchant uses an old value, and thus permits the possibility that an authorization determination is affirmative, despite the security code value being old.

Figure 2:
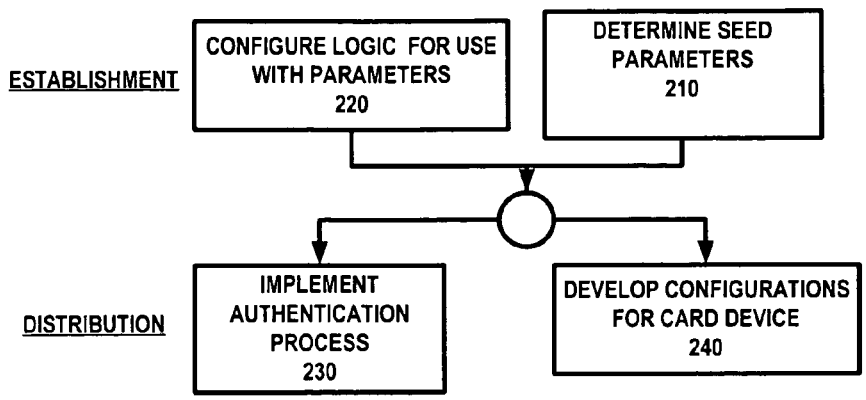
FIG. 2 illustrates a flow process for implementing a time-varying security code with a portable device assigned to a financial account, under an embodiment of the invention.

FIG. 2 illustrates a flow process for implementing a time-varying security code with a portable device assigned to a financial account, under an embodiment of the invention. A process such as described with FIG. 2 may be implemented in a scheme such as described by FIG. 1. In one embodiment, a process such as described with FIG. 2 may be used to establish a card device that can produce a time-varying security code value which can be presented (with account data and other information) to an authorization agent, who can independently predict, or otherwise determine the value of the security code at a given moment and act accordingly.

A flow process such as described may require an establishment stage and a distribution stage. At the establishment stage, the algorithms and parameters by which the value of the security code is to change over time is determined. Such a stage may include a step 210, in which a set of seed parameters are identified for a particular device. The set of seed parameters may form a basis of future security code values for that device. The set of seed parameters may serve to initialize input values to algorithms that determine the security code values in future instances. The seed parameters may correspond to numeric values, such as provided by a time stamp or a randomly generated number. The set of seed parameters 210 may be determined on an individual basis for a single financial account and/or device. Alternatively, one set of seed parameters may be distributed to a class or set of devices and/or accounts.

In a step 220, logic is configured to perform one or more of (i) determining when a security code value is to be changed, and (ii) determining the change or value of the security code. The logic may include algorithms and processes that use the seed parameters determined in step 210. As such, the determinations made by the logic may be based at least in part on the seed parameters (or other parameters such as described in FIG. 1).

According to one embodiment, step 210 is performed when a card or other portable device is created or configured. Step 220 may be performed for a particular card at any time when the seed parameters become known. As such, both the seed parameters and the logic configured in step 220 may be associated, either at the establishment stage or subsequently, with a particular account, portable device and/or user.

During a distribution stage, (i) the seed parameters, and (ii) logic for determining security code values based on the seed parameters, are distributed for use and authorization. In a step 230, an authorization process is implemented with an authorization agent. The authorization process may be provided on, for example, server(s) or other computing resources of the authorization agent. In one embodiment, implementation of the authorization process may include distribution and/or configuration of a program, module, or sub-routine, that uses logic and seed parameters from step 210 and step 220, to perform an algorithm that can independently determine what the value of the security code is at a given instance. For example, a program may be implemented by an authorization agent that (i) is associated with a particular account, (ii) contains the seed parameters of step 210, and (iii) executes an algorithm or other process that is identified by the logic of step 220. As another example, step 230 may import parameters that identify the associated account and the seed parameters. In such an example, parameters may also identify, select, determine or otherwise configure the algorithm by which the security code value is determined from the seed parameters. In either case, the determination of the security code values made in step 230 may be performed for an individual account and associated portable device.

In step 240, an individual portable device (e.g. card device) is developed and configured based on the seed parameters determined in step 210, and the logic configured in step 220. In an embodiment, the configurations made to the portable device are specific to that device. For example, the logic and/or seed parameters may be unique to the account associated or identified by the portable device. The development of the portable device to accommodate configurations may include a physical process in which, for example, processing resources of the portable device are provided programming or executable logic. Such programming may use the seed parameters of step 210 and algorithms defined by the logic of step 220. Over time, the embedded logic may execute to determine the value of the security code parameter at different instances.

Once the portable device is developed and configured, and provided with an authorization process that implements common logic and seed parameters, a pairing or correlative relationship is established between a portable device and an independent and remote authorization process, in which (i) a security code value on a given portable device may be changed over time, and (ii) an independent authorization process can verify that any value presented as being the security value of the given device at a particular moment is in fact correct (i.e. it is displayed on the portable device at the very moment). Such a correlative relationship can be authenticative in that a person presenting the value of the security code on a portable device, along with other information (e.g. name, account information etc.) provided by that portable device, is likely to be in possession of the portable device. Such a relationship provides an additional element of security, as compared to, for example, traditional credit card devices which carry both account information and static security codes (e.g. CCV numbers). With traditional credit cards, for example, the person presenting the CCV number simply needs to know the number, and thus not have current possession of the card.

Authorization

Once a correlative relationship is established between a portable device and an authorization process, the authorization process may be performed as needed by an authorization agent. The authorization agent may correspond to an entity or programmatic element. For example, in the context of a transaction involving a buyer, vendor, and financial institution (e.g. see FIG. 4), the authorization agent may be operated by a service that is not part of the financial institution. Alternatively, the authorization agent may be part of the financial institution or its resources. Still further, the authorization agent may be a programmatic component that executes with the vendor, the financial institution, by both vendor and financial institution, or by one or more other parties. In a transaction such as described, the role of the authorization agent is to provide an authorization determination, conclusion, or recommendation.

Figure 3:
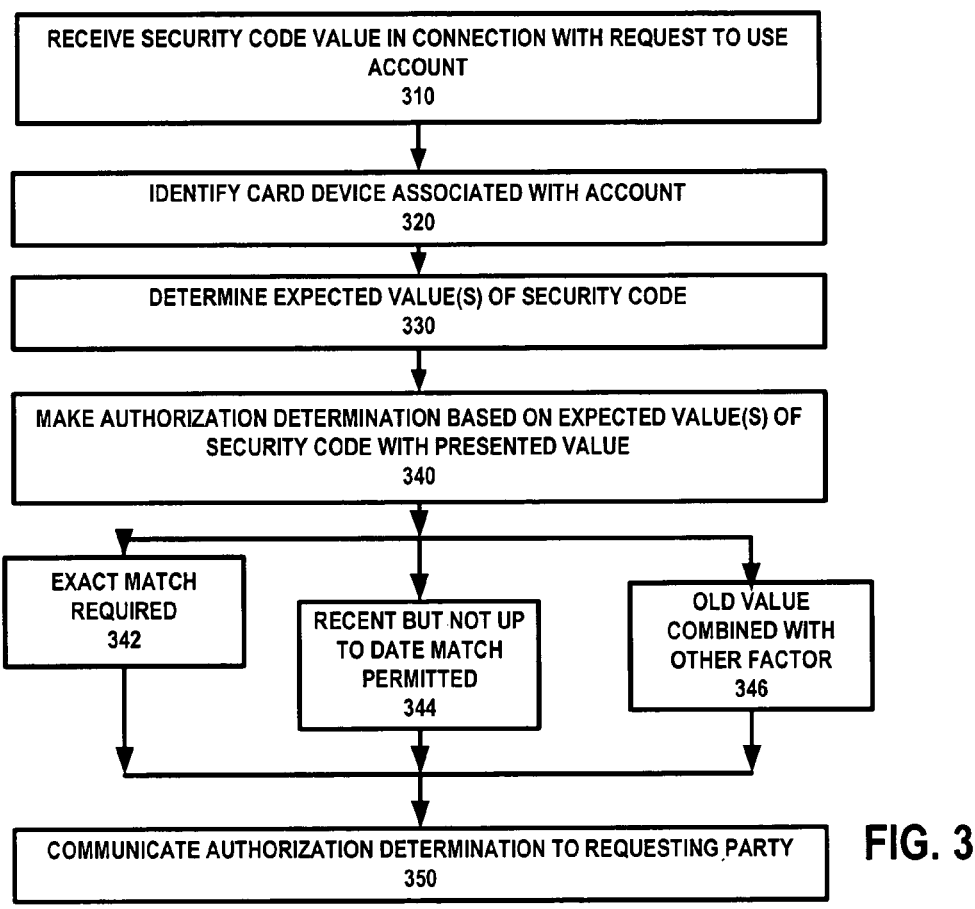
FIG. 3 illustrates a method that may be performed by an authorization agent, under an embodiment of the invention.

FIG. 3 illustrates a method that may be performed by an authorization agent, under an embodiment of the invention. A method such as described may be performed when, for example, a card device (e.g. credit card or debit card) holder presents information from the card for access and use to a related financial account. At the time when a transaction is initiated, the authorization agent may be presented with some of the information provided by the user. For example, the vendor or user may communicate with the authorization agent over a telephony or data networks (e.g. Internet) in order to receive the recommendation of the authorization agent.

In this example, when the authorization is sought, an authorization agent may receive account data. In one embodiment, account data includes one or more of the following: (i) identifier of the account, (ii) name of person or entity on account, (iii) expiration date of account, (iv) name of financial account, and/or (v) security code value. In one embodiment, all the account data needed to complete a transaction, including the security code value, is present on a card device when the authorization is sought. For example, a card device that can be used as credit card may provide through various human-readable mediums, all of the account data, including the security code value. However, in certain instances, such as when the device in use is a debit card, the user may provide additional data, such as in the form of a pin number or password.

A common context for use of such account data is over a data network such as the Internet, since the time-varying security code may be needed when the identity of the user cannot be visually confirmed. As such, step 310 may include receiving the account data over a secure connection using a network such as the Internet, or over a secure network such as operated by some financial institutions.

In step 320, an identification is made of the card device. The identification of the card device may be made through some or all of the account data, such as by a numerical identifier of the account and the name of the entity/person on the account.

In step 330, an expected security code value is determined for the card device being used. The expected security code value is determined independently of the security code value presented by the user. In order to determine the expected security code value, one embodiment provides that a corresponding authorization process is identified for the particular card device. The corresponding authorization process is one that (i) includes the logic and/or seed parameters used by the card device that determine what security code value the card device is displaying, and/or (ii) includes past security code values or logic for determining past security code values.

In one embodiment, the corresponding authorization process may be executed intermittingly, or each time authorization is requested. For example, when an authorization request is received, the authentication process may identify, for the particular card or account, the seed parameters and the algorithm (or configurations) for determining the security code parameters, as well as other parameters and data (such as the passage of time) in order to determine what the security code value should be at the time the request is received. In another embodiment, the corresponding authentication process may execute on an ongoing basis, so that the authentication process tracks or is actively synchronized with the device that presents the security code value.

In step 340, an authorization determination is made based on the expected values, as determined in step 330, and the presented value from the device, as received in step 310. The authorization determination may take various forms. For example, in one simple case, the authorization determination may correspond to an affirmative authorization or a rejection. But intermediate determinations are also possible, such as a case where authorization is contingent on another factor. For example, if the security code value is minutes old, but not the most recent value, the authorization determination may correspond to an affirmative or a request for reentry if the security code value.

Steps 342, 344 and 346 illustrate alternative variations to the different authorization determinations or actions that can be made, under one or more embodiments. In step 342, an exact match is required between the expected security code value and the presented security code value in order for an authorization determination to be positive.

In step 344, the presented security code value may not match, but may be a recent security code value. For example, the case may be that a user views the security code value and enters one value, but during the time the user presents the account data, the value changes. For example, the value may change every hour, and the user may have viewed the value and presented it just before the change. The authorization process may maintain a list of recent values for the particular device, and approve the authorization if the security code value is recent enough.

Step 346 provides that a situation where in certain cases, an old security code value may be acceptable. For example, an online merchant may accept a security code value at one time, and maintain that value in an electronic wallet. The authorization agent may be programmed or trained to know that when the authorization is sought through a particular source (e.g. online merchant), to accept the old security code value. Thus, such an online merchant may use a security code value at one time as a static code.

Numerous other situations and variations are considered for making an authorization determination or recommendation. For example, a vendor or online merchant may elect to accept responsibility for an old security code value, in which case an authorization is made. In some embodiments, verification of a security value that is time varying may be approximate. For example, a security code may be deemed valid if it was known to be generated by the card within a recent period of time, such as one week. In some embodiments, a security code may be deemed progressively more suspicious in rough proportion to the time since the code was last generated. For example, a security code that was generated today by a specific card may be less suspicious than one generated a week ago, which may in turn be less suspicious than one generated a month ago. For example, in the extreme, when a security code on a given card has not been generated for a long time, such as several months, or never generated, then submitted card may be deemed not only very suspicious, but completely invalid. In some embodiments, the reuse of a security code by a merchant for additional transactions may be deemed as less suspicious if the security code was less suspicious when last used by the same merchant in conjunction with the associated card. For example, if a security code is first used by a merchant on the day that the card generated that security code, then it may be deemed non-suspicious. In this example, if the same merchant attempts to reuse that card number and security code a month later, that transaction may be deemed less suspicious, for example deemed non-suspicious.

In some embodiments, higher suspicious levels may trigger additional investigation into a customer transaction. For example, an attempt by a merchant to use a security code that is not current, for example a code that is several weeks old, may increase the suspicion level of a transaction enough to cross a threshold. For example, suspicion levels may be a combination of computed age of generation of the security code, along with traditional measures, such as size of transaction, location of transaction, and frequency of transactions, relative to a customer's common practice. In some embodiments a threshold for suspicion may by a constant, for example a threshold may be defined to include the use of a security code that is older than 2 weeks. In some embodiments, a threshold may be probabilistic. For example, the probability of further investigation of a transaction may be 1 in a 1024 when the security code is currently being generated, 1 in 512 when it is a day old, 1 in 256 when it is two days old, . . . 1 in 2 when it is 9 days old or older. An example of further investigation may include requiring direct contact with a customer for verification, or contacting a customer, for example via a phone call, within a short period of time, such as within 1 day, to verify that a card number and security code is being used with permission of the actual card holder.

Step 350 provides that the authorization determination is communicated or acted upon. For example, an authorization agent may authorize or not authorize, and communicate the decision to a financial institution or to a vendor. The communication may be made through a network, such as the Internet, or even in person, such as through a telephone call.

Authorization Request

Figure 4:
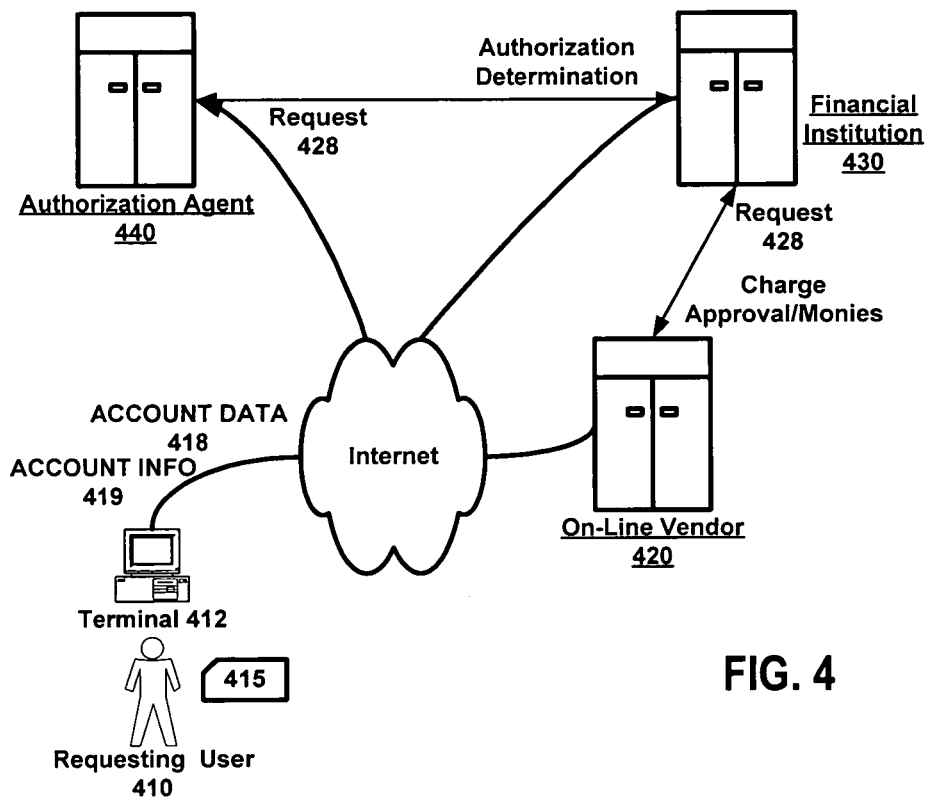
FIG. 4 illustrates a scenario in which a security code value may be used in connection with a financial account, under an embodiment of the invention.

FIG. 4 illustrates a scenario in which a security code value may be used in connection with a financial account, under an embodiment of the invention. FIG. 4 assumes a credit or debit card implementation, meaning the account data is displayed on the card device. The security code value may be displayed and altered, using integrated hardware, such as described with an embodiment of FIG. 6.

The particular scenario described with FIG. 4 is an online transaction. An online transaction illustrates a usage scenario for one or more embodiments of the invention, in that security codes are sometimes used with online transactions. Some online transactions require some presentation of a security code value (e.g. CCV), which traditionally is static. Presentation of the CCV value, for example, provides evidence that the user has the card. As mentioned, some embodiments introduce a time-varying security code value, which may replace or supplement the static security code value. A time-varying security code provides additional assurance that the holder of the card device is in actual possession of the card, rather than being a person who knows all the information previously visible or readable on the card.

In FIG. 4, participants of the transaction include a user 410, an online vendor 420, a financial institution 430, and an authorization agent 440. The financial institution 430 may correspond to a bank. The authorization agent 440 may correspond to a service, similar in purpose to existing services such as provided by MASTERCARD or VISA. The authorization agent 440 may in fact be a programmatic component that operates as part of a service. User 410 may operate a terminal 412 (e.g. desktop computer, cellular device etc.) to access merchandise for sale by the vendor 420. In order to make a purchase, the user 410 supplies account data from a card device 415 configured under one or more embodiments of the invention. As an example, the card device 415 may be a credit card type device, such as described with FIG. 6, 7A and 7B, having a time-varying security code value.

In making a purchase, the user 410 may initiate a request for authorization and use of his account. For example, the user may initiate the request through the online vendor 420, although it is possible to use intermediate parties, such as provided by services such as PAYPAL. In order to initiate authorization, the user enters account data 418 contained on the card device 415. The account data 418 may be data provided on the card device in human-readable form, including, for example, an account number (or other identifier of the account), a name appearing on the card, an expiration date of the card, and the type of card (e.g. MASTERCARD CREDIT). Additionally, the account data 418 includes a security code value that is time-varying. The security code value may be provided on a display or other surface of the device 415, so that it can be rendered when changed. As described, the security code value may be changed based on logic internal to the device 415. Under one implementation, the user can simply view the account data 418. For example, as described with FIG. 7A and FIG. 7B, the account data may be printed or provided on raised characters on the card, and the security code value may be provided on an internal display of the device 415.

In addition to account data 418, the user may enter additional information 419 associated with the account data or card device 415. The additional information 419 may be associated with the account, but not on the card device 415, at least not in human-readable form. As an example, when the card device 415 operates as a credit card 415, the user may also enter a billing address, which might not be provided on the card. In some cases, such as when the card device 415 operates as a debit card, the user may enter a pin code with the account data. As such, while the user may not have such additional information 419 displayed on the card device 415, in some embodiments, the additional information 419 may, for example, be information that the user can readily remember, although the information may extend to items that the user may not readily know.

Under one scenario, the online vendor 420 may receive the account data 418 and the additional information 419 and then submit an authorization request 428 to the authorization agent 440, or alternatively to the financial institution 430. When provided to the financial institution 430, the authorization request 428, along with the account data 418 and possibly the associated information 419 may be forwarded to the authorization agent 440. The authorization agent 440 may be in possession of the authorization process for the particular card device 415. In one embodiment, the authorization agent 415 uses the account number and other account data 418 to access and determine independently what the security code value should be on the card device 415 at the time it receives the authorization request. As described with FIG. 2 and FIG. 3, the authorization agent 440 may determine an expected security code value for the card 415, given the time the request is made or received, then compare the security code value to the security code value received with the authorization request. The authorization agent 440 communicates an authorization determination 442 to the financial institution 430, which then acts on the authorization determination. For example, the financial institution 430 may issue funds, or approve a charge if the authorization determination 442 is positive, or decline the transaction if the authorization determination is negative.

Numerous variation and alternatives are possible. In practice, numerous financial institutions 430 may be involved in a given transaction. For example, separate banks may exist for the user and the online vendor. The user's bank may ultimately hold the account that is to be accessed and used in the transaction (i.e. the bank from which funds are transferred from), but the vendor's bank may advance funds to the vendor when authorization received.

While an online transaction is illustrated with FIG. 4, it should be noted that numerous other scenarios exist for the presentation of a security code value in connection with the card device 415 or other portable device. For example, a time-varying security code value may be presented by a card holder over a phone, and confirmed manually or programmatically (e.g. through speech recognition software). Still further, the user may present the account information through a card reader, such as at a gas station, and then present the time-varying security code value through a point-of-sale terminal. Even in an in-person transaction, the merchant may supplement the card information with the time-varying security code value in order to ensure the corresponding card was present.

As still another type of transaction, the terminal 412 may correspond to a point-of-sale terminal, rather than a terminal in the possession of the user. Thus, for example, the user 410, vendor 420 and terminal 412 may be at a local of the vendor. The terminal 412 may receive account data 418 from a user swiping it, entering it manually, or even by a clerk who enters the account data 418 and/or associated information 419 at the time of sale.

Figure 5:
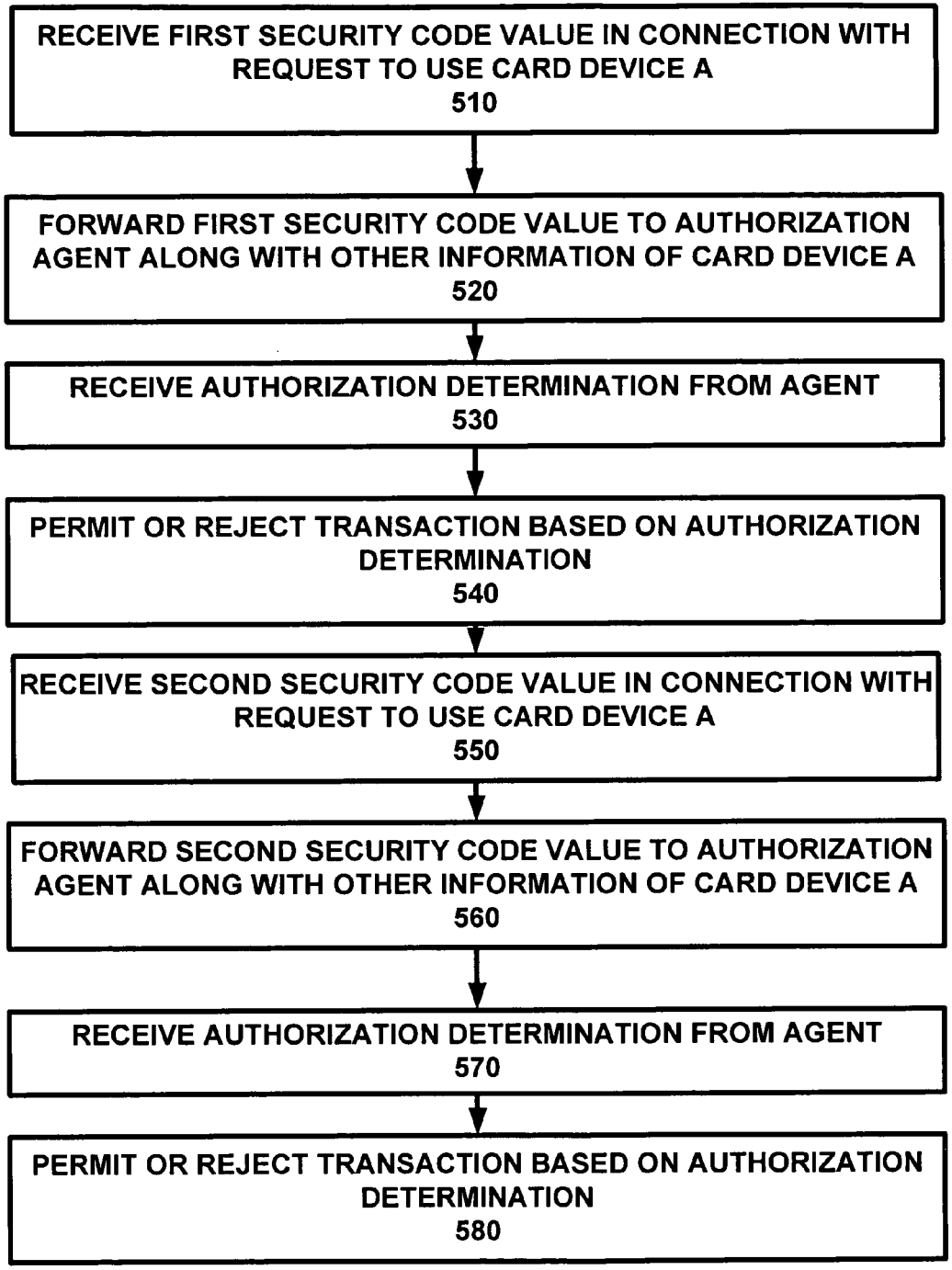
FIG. 5 illustrates a method by which a vendor can receive authorization for a particular device on which a time-varying security code is provided, under an embodiment of the invention.

FIG. 5 illustrates a method by which a vendor can receive authorization for a particular device on which a time-varying security code is provided, under an embodiment of the invention. In step 510, a first security code value may be received in connection with a request by presented to use a particular card device (Card Device A). In step 520, the vendor may forward account data and other information including the first security code value to an authorization agent. Step 530 provides that the vendor receives the authorization determination from the agent. In step 540, the transaction may be permitted or declined based on the determination of the authorization agent.

At a subsequent time, such as a day or even a year later, Card Device A may be presented to the vendor once again. All of the information of Card Device A may remain as before, meaning it may carry the same account data. The only change is the security code value. In step 550, the vendor receives a second security code value in connection with a request to use the Card Device A. Step 560 provides that the second security code value is forwarded along with other information of the Card Device A to the authorization agent. An authorization determination may be received from the agent in step 570. In step 580, the vendor permits or rejects the transaction based on the second authorization determination.

As illustrated by a method of FIG. 5, a vendor may receive the same card device multiple times, with each instance being provided a new security code value. Other information of the card, such as its account identifier, are unchanged. The vendor can process the card with the time-varying security code by communicating with the authorization agent.

Device Hardware

According to an embodiment, a device is provided having features that include (i) portability, (ii) carry or display account identification (e.g. numerical identifier) and other account data in human-readable form, (iii) programmatic capability to perform an algorithm or process that results in determination of a security code value that coordinates or correlates with an independent authentication process (such as described with FIG. 2 and FIG. 3), and (iv) a human-readable medium on which the value of the security code is displayed. The device may be linked to a financial account, such as through credit card or debit card services. As described with FIG. 4, a user of device may submit account data maintained on the device when authorization for use or access to the linked account is sought.

Figure 6:
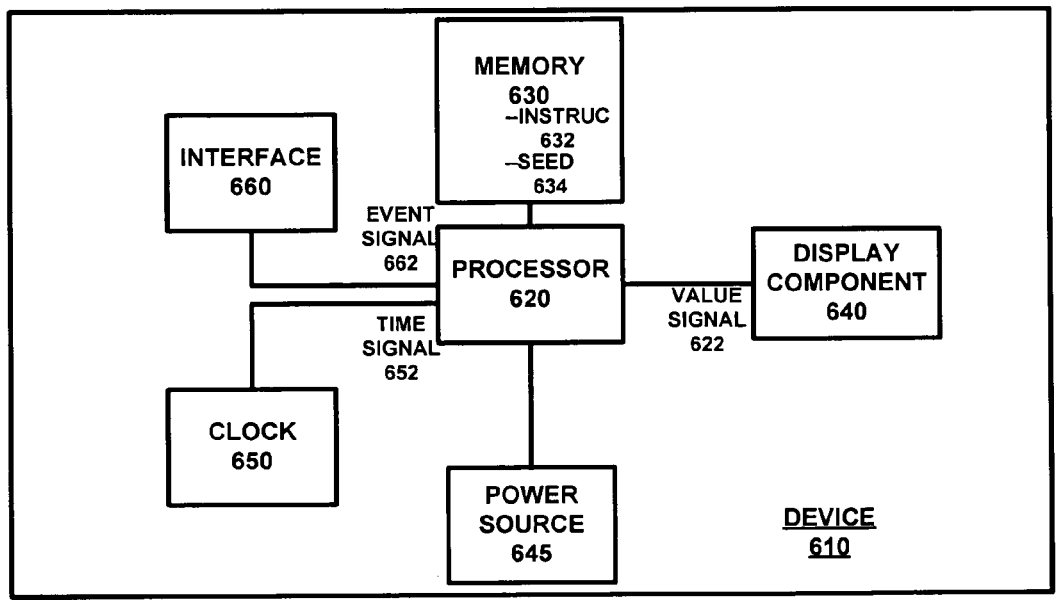
FIG. 6 illustrates a basic block diagram for components of device, under an embodiment of the invention.

FIG. 6 illustrates a basic block diagram for components of a portable device 610, under an embodiment of the invention. Device 610 may include a processor 620, a memory 630, a display component 640, and a power source 645. Under one embodiment, the device 610 includes an internal clock 650 that generates a time signal 652 received by the processor 620. The device 610 may also include a machine or network interface 660 to receive data from external sources.

According to an embodiment, processor 620 is configured to execute an algorithm for changing the value of the security code value. As mentioned with other embodiments, the security code value may be changed as a function of time, events, or a combination of both. The memory 630 may store instructions 632 that can be executed by the processor 620 to perform the algorithm(s) for changing the security code value. The memory 630 may also include seed values 634 or parameters that provide initialization values for hashing, encrypting and/or changing the security code value over time.

In one embodiment, the instructions for changing the security code value are time dependent. Values determined from the time signal 652 may provide time input for basing changes to the security code value. Example of time inputs include a time stamp, or a duration measurement for the passage of time.

Under one embodiment, the instructions for changing the security code value are responsive to events or outside directives, such as provided by the financial institution. In one embodiment, interface 660 may receive communications in the form of directives from outside sources, causing change to the security code value, or even to the algorithm for determining it. For example, upon use of the card, the interface 660 may receive a command from the financial institution regarding future changes to the security code value. Alternatively, the interface 660 may be in the form of a wireless receiver that receives commands via cellular or other wireless communications, such as Bluetooth, with or without the involvement of the user. The interface 660 may also serve as an event recorder. For example, the interface 660 may detect when an aggregate spending limit for changing the security code parameter has been reached. When implemented, command or event notifications for altering the security code value or the algorithms may be provided from the interface 660 to the processor 620 as event signal 662.

A value signal 622 provided by the processor 620 to the display component 630 may carry the security code value at a given instance. With each change of the security code parameter (responsive to time signal 652 and/or event signal 662 inputs), the security code value provided by the value signal 622 may change. The display component 640 may display the security code value for the user at a given instance. In some embodiments, the display may persist when there is no power available on the device.

The power source 645 may be in the form of a battery or battery module. Alternatively, the power source 645 may correspond to a photo cell unit, an inductive power pickup, or even a kinematic energy generator. The power source 645 may supply power to all of the components of the device 610.

As described with various embodiments herein, device 610 may be a card device. The card device is a device that is relatively flat and may be rectangular. In one embodiment, the card device emulates a credit card in dimensions, although thickness or other dimensions can be varied to accommodate the various components of the device. In one embodiment, device 610 may be implemented as a smartcard or similar device, which includes any credit card or identification (ID) card sized device that includes active electronic components. As such, device 610 may comply with the International Organization for Standardization (ISO), 7816 Smart Card Standard In order to accommodate an embodiment in which the device 610 has a credit card or smart card form factor, components of the device may be sufficiently dimensioned to be embedded within the thickness of the device 610, which may have substantially the thickness of the credit card. In an embodiment, processor 620 may be flattened, such as currently in use with smart card technology. Display component 640 may also be flat, such as in the form of an LCD display. An example of a flat display that may be embedded in or on the surface of such a card is produced by POLYMERVISION as discussed at http://www.polymervision.com, with a current production thickness of roughly 100 microns, which is roughly as thick as a piece of paper. For example, a POLYMERVISION display may be laminated to one or more transparent or translucent plastic layers in the construction of a card.

Card Device Appearance and Standardization

As mentioned, embodiments of the invention may be implemented through use of a card device that can be carried by a user. Card devices exist today in the form of credit or debit cards, which for the most part have no active components, but for a magnetic strip that can carry provide some machine readable information. Card devices also exist in the form of smart cards, containing active components and may participate in potentially secure and/or authenticated data communication exchanges, for example using cryptography such as public key cryptography. A time-varying security code, such as provided with embodiments described above, may be computed and displayed in a device that serves as a credit card, debit card or smart card device.

Accordingly, an embodiment may integrate the feature of a time-varying security card parameter into some or all of the current requirements and formatting of standard financial cards. As used herein, the term standardized financial card means a card having information, formatting, and dimensions set by a standardized financial organization. For example, a device in which a time-varying security code parameter is integrated, may have a design specified by the International Organization for Standardization (ISO), which may include Visa and MasterCard. Each international card scheme, such as Visa, MasterCard, Maestro, American Express, Diners Club, JCB, as well as the UK Domestic Cheque Guarantee Card Scheme, has its own specific requirements in order to ensure additional security and consistency of scheme branding. The standardized characteristics that are most common include card materials, card dimensions, and the information that appears on the card face, such as the primary account number (PAN). The PAN may contain a maximum of 19 digits that serve to identify the card issuer and the cardholder. A standardized financial card may also include a magnetic stripe, as well as a signature strip.

Figure 7A:
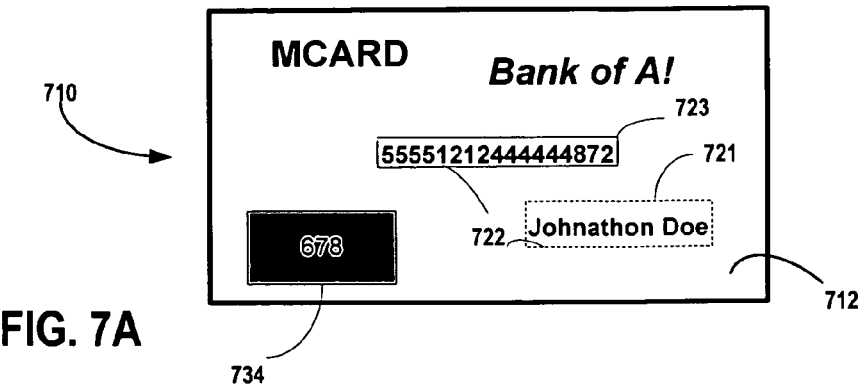
FIGS. 7A and 7B illustrate a device that is configured to substantially resemble a standardized card format, while having integrated capabilities for generating a time-varying security code, under one or more embodiments of the invention.
Figure 7B:
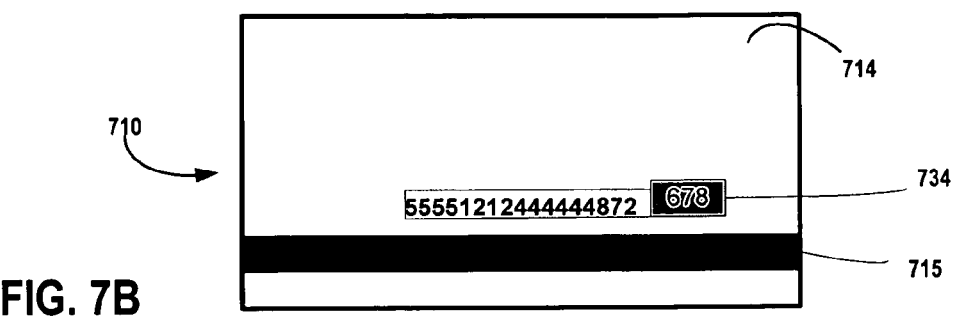

FIGS. 7A and 7B illustrate a device 710 that is configured to substantially resemble a standardized card format, while having integrated capabilities for generating a time-varying security code, under one or more embodiments of the invention. In an embodiment, device 710 is dimensioned substantially to resemble a credit card, particularly in length and width, and possibly thickness. Even with its limited dimensions, device 710 may include embedded components described with FIG. 6.

FIG. 7A illustrates a front side 712 of the device 710, on which some or all of the account data carried by the card is provided in human-readable form. Data carried by the device may include data carried on a magnetic stripe, data provided in raised print, and data printed or embedded in the card. For example, raised print 722 on front side 712 may include a user's name 721, card number 723 (e.g. PAN or other identifier of the account), and/or expiration date (not shown). In an implementation, a backside 714 of the card 710 may provide printed data, which in the past has included a static security code such as the CVV or CVC code. In the example provided, the back side 714 may also include the magnetic strip 715, and the PAN or identifier 723 in print.

As mentioned, a time-varying security code 734 value may be provided on a display 730 that can be provided on either the front side 712 or back side 714 of the device 710. Display 730 may be constructed in a manner described with an embodiment of FIG. 5. In an embodiment, the security code value 734 may have similar size and format to a traditional CVV or CVC code currently in use on financial cards, such as credit and debit cards. For example, the security code value 734 may be three or four digits in length, to match the size of existing CVV or CVC numbers, and thus better enable use of existing authorization infrastructure and processes that are designed for CVV/CVC numbers. But alternative implementations may be used in which longer number strings/sets, or even symbol sets (e.g. alphanumeric combinations, hexadecimal number representations) are used. For example, the security code value 734 may allow for letters and numbers, where in contrast a traditional CVV or CVC code may only allow numbers. It is even possible to use alternative representations, such as geometric figures, colors, or shading, where such representations change in characteristic over time. For example, the color assigned as the value of the security code may change or become darker. The shape assigned to the value of the security code may morph from a circle to a triangle. Numerous other variations are possible. In some embodiments, a time varying security code may be larger than a CVC or CVV code, for example including 6 characters.

As shown by an embodiment of FIG. 7A and FIG. 7B, account data required for using the card may be provided in human-readable form. For example, the PAN and security code value 734 are displayed to the user, enabling the user to manually enter, speak or communicate the values when seeking authentication.

ALTERNATIVE EMBODIMENT

In some embodiments, static code related infrastructure may be used to verify a time varying security code. For example, a customer may supply a time varying security code in place of a static security code, such as a CVV or CVC code, when requested by a merchant. As a second example, a merchant may include a time varying security code in a similar or identical field to a CVC or CVV code when requesting authorization for use of a card and code. In some embodiments, a merchant bank may provide a similar interface for validating a time varying code as for validating a static code such as a CVC or CVV code, for example a merchant bank may accept a dynamic code in a substantially similar field to that which is used for a static code, and may respond by declaring the supplied code to be valid or invalid. For example, a merchant bank may contact an issuing bank to verify that a security code is sufficiently current.

While some embodiments described above provide for a context of authorizing or using financial accounts or resources, other embodiments contemplate other purposes, such as identification. For example, an embodiment provides for a card device that serves to identify an individual. Thus, for example, a time-varying security code may be provided on such a card for purpose of validating that a person providing information from an identification card is in fact in possession of the card.

Furthermore, while some embodiments described above provide for an authorization determination to be made, other embodiments contemplate additional security measures from use of a time-varying security code. In some embodiments, a fraudulently used card and associated security code may be used to identify the date of probable compromise of the cards number and security code. This can aid identifying those involved in the proliferation of fraud. For example, after a card number and associated security code have been exposed as being fraudulently used, the security code can be matched against a list of vendors that accepted non-fraudulent uses of the card in conjunction with the specific fraudulently used security code. In that example, merchants that were privy to a compromised code, for example merchants that attempted transactions with the compromised code, may be considered suspects as involved in the fraud. For example there may be a determination of suspicion that an employee or computer system at a merchant was allowing codes and numbers to be compromised. In that example, the presence of a sufficient number of compromises related to a single merchant for distinct cards may be used to further determine an increase the suspicion with regard to that merchant. For example, more than one such event involving a single merchant and more than one compromised credit card (and code), within in a fixed period of time, such as 1 day or 1 month, may be viewed as sufficient evidence for determining the need to further investigate the merchant. In some embodiments, sufficient evidence that a merchant was involved with a set of compromises may be reason for a merchant's account to be suspended, or for the merchant to be held liable. An example of suspension is the refusal to accept additional transactions from the merchant. An example of liability is a requirement that a merchant make reparations for fraudulent charges made with corresponding compromised cards and codes.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A card device for enabling use of an account to complete financial transactions, the card device comprising:
one or more mediums on which a plurality of alphanumeric values are held for use in enabling a user of the card device to be authorized to use the account, the plurality of alphanumeric values including (i) a static data set that includes a numeric identifier of the account and a name of the user associated with the account, and (ii) a security code having a value that is time-varying;

wherein the one or more mediums include at least (i) a first medium that displays in human-readable form, for anyone who holds the card device, the static data set, and (ii) a second medium that displays the security code;

wherein the static data set and the security code are required, and provide all the information necessary from the card device, to enable receipt of authorization for a given financial transaction; and logic for determining the value of the security code based at least in part one of a timing parameter or an event parameter, wherein the logic determines the value of the security code in a manner that is acceptable to an authorizing agent.

2. The card device of claim 1, further comprising a display component to display at least some of the plurality of alphanumeric values, including at least the security code value.

3. The card device of claim 1, wherein the card device has dimensions of a credit card, and includes a processor embedded within a thickness of the device on which the logic for determining the value of the security code is provided.

4. The card device of claim 1, wherein the first medium on which the static data set is held includes a physical imprint and/or a raised formation.

5. The card device of claim 4, wherein the card device also includes a medium that is readable by a computer to store additional static data.

6. The card device of claim 1, wherein at least some of the alphanumeric values enable the card to be used as either a credit card or as a debit card.

7. The card device of claim 1, wherein the card device includes a picture of the user.

8. The card device of claim 1, wherein the logic is configured to determine the value of the security code based at least in part on an algorithm that is known or available to the authorizing agent.

9. The card device of claim 8, wherein the logic is configured to determine the value of the security code based at least in part on one or more seed parameters that are used by the algorithm.

10. The card device of claim 9, wherein the event parameter is based on an authorization for funds of a particular amount in an aggregate of uses of the card.

11. The card device of claim 1, wherein the static data set includes an expiration date of the account.

12. The card device of claim 1, wherein the logic is provided by a processor that executes a set of instructions.

13. The card device of claim 12, wherein the processor is a flattened microprocessor.

14. The card device of claim 12, further comprising a display coupled to the processor, wherein the display is configured to display the value of the security code in multiple instances over time as the value varies.

15. The card device of claim 12, further comprising a clock signal generator coupled to the processor, wherein the clock signal generator generates a time signal for providing the timing parameter to the logic.

16. The card device of claim 1, further comprising an interface coupled to the processor, wherein the interface is configured to (i) detect one or more designated events, (ii) generate a signal that communicates an occurrence of one of the one or more designated events as the event parameter to the processor.

17. The card device of claim 1, wherein the card device is a standardized financial card, and wherein the security code is a three or four digit Card Verification Value.

18. A standardized financial card device comprising:
one or more mediums on which a plurality of alphanumeric values are held for use in enabling a user of the card device to be authorized to use the account, the plurality of alphanumeric values including (i) a static data set, and (ii) a time-varying three or four digit Card Verification Value;
a processor configured to determine the value of the Card Verification Value based at least in part one of a timing parameter or an event parameter; and
a display surface that communicates with the processor to display the value of the Card Verification Value as determined by the processor at a given instance.

19. A computer readable medium for use on a standardized financial credit card device, wherein the computer readable medium carries instructions for enabling use of an account, wherein the instructions, when executed, cause performance of steps comprising:
varying a value of a three or four digit Card Verification Value based on one or more of a timing parameter or event parameter; and
displaying the value of the Card Verification Value on a display of the card device.

* * * * *

UNITED STATES PATENT AND TRADEMARK OFFICE
CERTIFICATE OF CORRECTION

PATENT NO. : 7,427,033 B1
APPLICATION NO. : 11/363754
DATED : September 23, 2008
INVENTOR(S) : James Roskind It is certified that error appears in the above-identified patent and that said Letters Patent is hereby corrected as shown below:

In the Claims:

Claim 1, Column 17, Line 12
 Replace "least in part one of a"
  with --least in part on one of a--

Claim 18, Column 18, Line 30
 Replace "least in part one of a"
  with --least in part on one of a--

Signed and Sealed this

Twenty-fourth Day of August, 2010

David J. Kappos
*Director of the United States Patent and Trademark Office*